(12) United States Patent
Levy

(10) Patent No.: US 7,055,034 B1
(45) Date of Patent: May 30, 2006

(54) METHOD AND APPARATUS FOR ROBUST EMBEDDED DATA

(75) Inventor: Kenneth Lee Levy, Stevenson, WA (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 09/404,291

(22) Filed: Sep. 23, 1999

Related U.S. Application Data

(60) Provisional application No. 60/101,851, filed on Sep. 25, 1998, provisional application No. 60/110,683, filed on Dec. 2, 1998, provisional application No. 60/114,725, filed on Dec. 31, 1998, provisional application No. 60/126,591, filed on Mar. 26, 1999, provisional application No. 60/123,587, filed on Mar. 10, 1999, and provisional application No. 60/126,592, filed on Mar. 26, 1999.

(51) Int. Cl.
*H04L 9/00* (2006.01)

(52) U.S. Cl. .............. 713/176; 380/201; 380/282; 713/176; 382/100; 382/250; 382/252

(58) Field of Classification Search ............. 713/176; 382/100, 250, 252; 380/282, 201
See application file for complete search history.

(56) References Cited

U.S. PATENT DOCUMENTS

| | | | | |
|---|---|---|---|---|
| 3,984,624 | A | 10/1976 | Waggener | 178/5.6 |
| 4,238,849 | A | 12/1980 | Gassmann | |
| 4,422,171 | A | * 12/1983 | Wortley et al. | 714/748 |
| 4,807,031 | A | 2/1989 | Broughton et al. | 358/142 |
| 4,943,973 | A | 7/1990 | Werner | |
| 5,091,966 | A | 2/1992 | Bloomberg et al. | 382/21 |
| 5,103,459 | A | 4/1992 | Gilhousen et al. | 375/1 |
| 5,134,496 | A | 7/1992 | Schwab et al. | 358/335 |
| 5,146,457 | A | 9/1992 | Veldhuis et al. | 370/111 |

(Continued)

FOREIGN PATENT DOCUMENTS

| | | |
|---|---|---|
| DE | 2943436 A | 5/1981 |
| DE | 2943436 | 5/1981 |
| EP | 650146 A | 4/1995 |
| EP | 95/3938 A2 | 11/1999 |
| JP | 200041144 A | 2/2000 |
| WO | WO95/13597 A2 | 5/1995 |
| WO | WO9626494 | 8/1996 |
| WO | WO0172030 | 9/2001 |
| WO | WO0173997 | 10/2001 |

OTHER PUBLICATIONS

Anderson, "Stretching the Limits of Steganography," Information Hiding, First Insternational Workshop Proc., May 30–Jun. 1, 1996, pp. 39–48.

(Continued)

*Primary Examiner*—Justin T. Darrow
(74) *Attorney, Agent, or Firm*—Digimare Corporation

(57) ABSTRACT

This invention describes a method and apparatus for the increasing the robustness of embedded data. Since many times embedded data is susceptible to removal by an unauthorized person, one preferred embodiment enables an action such that removal of the embedded data provides the attacker no gain. In another preferred embodiment, recording devices are required to embed a registration code in copies, thus aiding in tracing illegal copies. Finally, dynamic locking, including modifying and encrypting the auxiliary data and applicable to all data embedding techniques, is shown to provide this robustness to duplication and modification. The apparatus implements the above two processes with a logic processor and storage unit.

14 Claims, 5 Drawing Sheets

U.S. PATENT DOCUMENTS

| | | | |
|---|---|---|---|
| 5,337,361 A | 8/1994 | Wang et al. ................... 380/51 |
| 5,374,976 A | 12/1994 | Spannenburg .............. 355/201 |
| 5,436,970 A | 7/1995 | Ray et al. .................... 713/176 |
| 5,499,294 A | 3/1996 | Friedman ..................... 380/70 |
| 5,530,751 A * | 6/1996 | Morris ....................... 380/202 |
| 5,613,004 A * | 3/1997 | Cooperman et al. .......... 380/28 |
| 5,636,292 A * | 6/1997 | Rhoads ....................... 382/232 |
| 5,646,997 A * | 7/1997 | Barton ....................... 713/176 |
| 5,652,626 A | 7/1997 | Kawakami et al. .......... 348/463 |
| 5,664,018 A * | 9/1997 | Leighton ..................... 380/54 |
| 5,687,191 A | 11/1997 | Lee et al. |
| 5,687,236 A | 11/1997 | Moskowitz et al. |
| 5,694,471 A | 12/1997 | Chen et al. ................... 380/25 |
| 5,710,834 A | 1/1998 | Rhoads |
| 5,719,937 A | 2/1998 | Warren et al. |
| 5,721,788 A | 2/1998 | Powell et al. |
| 5,774,452 A * | 6/1998 | Wolosewicz ................ 370/212 |
| 5,796,869 A | 8/1998 | Tsuji et al. ................. 382/203 |
| 5,799,092 A | 8/1998 | Kristol et al. ................. 380/51 |
| 5,819,289 A | 10/1998 | Sanford, II et al. ......... 707/104 |
| 5,822,360 A | 10/1998 | Lee et al. |
| 5,828,325 A | 10/1998 | Wolosewicz et al. |
| 5,835,639 A | 11/1998 | Honsinger et al. .......... 382/278 |
| 5,838,814 A | 11/1998 | Moore |
| 5,841,886 A | 11/1998 | Rhoads |
| 5,848,155 A | 12/1998 | Cox |
| 5,862,260 A | 1/1999 | Rhoads ....................... 382/212 |
| 5,875,249 A | 2/1999 | Mintzer et al. |
| 5,889,686 A | 3/1999 | Mimotogi et al. ............ 380/51 |
| 5,905,800 A | 5/1999 | Moskowitz et al. .......... 380/28 |
| 5,912,972 A | 6/1999 | Barton |
| 5,930,369 A | 7/1999 | Cox et al. |
| 5,933,798 A | 8/1999 | Linnartz ..................... 702/191 |
| 5,943,422 A | 8/1999 | Van Wie et al. |
| 5,970,147 A * | 10/1999 | Davis ......................... 713/172 |
| 5,974,548 A | 10/1999 | Adams ....................... 713/200 |
| 5,982,891 A | 11/1999 | Ginter et al. .................. 380/4 |
| 6,021,196 A | 2/2000 | Sandford, II et al. |
| 6,024,287 A | 2/2000 | Takai et al. ................. 235/493 |
| 6,044,182 A | 3/2000 | Daly et al. .................. 382/284 |
| 6,049,627 A | 4/2000 | Becker et al. |
| 6,061,793 A | 5/2000 | Tewfik et al. |
| 6,101,602 A | 8/2000 | Fridrich ...................... 713/176 |
| 6,131,162 A | 10/2000 | Yoshiura et al. ............ 713/176 |
| 6,226,387 B1 | 5/2001 | Tewfik et al. |
| 6,243,480 B1 | 6/2001 | Zhao |
| 6,249,870 B1 | 6/2001 | Kobayashi et al. |
| 6,272,634 B1 | 8/2001 | Tewfik et al. |
| 6,275,599 B1 | 8/2001 | Adler et al. |
| 6,282,654 B1 | 8/2001 | Ikeda et al. |
| 6,285,775 B1 | 9/2001 | Wu et al. |
| 6,286,761 B1 | 9/2001 | Wen |
| 6,292,092 B1 | 9/2001 | Chow et al. |
| 6,301,663 B1 | 10/2001 | Kato et al. |
| 6,321,981 B1 | 11/2001 | Ray et al. |
| 6,466,670 B1 | 10/2002 | Tsuria et al. ................ 380/202 |
| 6,487,301 B1 | 11/2002 | Zhao .......................... 382/100 |
| 6,490,355 B1 | 12/2002 | Epstein ....................... 380/203 |
| 6,496,933 B1 | 12/2002 | Nunally ...................... 713/176 |
| 6,499,105 B1 | 12/2002 | Yoshiura et al. ............ 713/176 |
| 6,504,941 B1 | 1/2003 | Wong ......................... 382/100 |
| 6,512,837 B1 | 1/2003 | Ahmed ...................... 382/100 |
| 6,611,607 B1 | 8/2003 | Davis et al. ................ 382/100 |
| 6,788,800 B1 | 9/2004 | Carr et al. .................. 382/100 |
| 6,807,534 B1 | 10/2004 | Erickson ..................... 705/51 |
| 2001/0019611 A1 | 9/2001 | Hilton |
| 2001/0026618 A1 | 10/2001 | Van Wie et al. |
| 2001/0027450 A1 | 10/2001 | Shinoda et al. |
| 2001/0034835 A1 | 10/2001 | Smith |
| 2001/0037455 A1 | 11/2001 | Lawandy et al. |
| 2001/0046307 A1 | 11/2001 | Wong |
| 2001/0047478 A1 | 11/2001 | Mase |
| 2002/0009208 A1 | 1/2002 | Alattar et al. ............... 382/100 |
| 2002/0016916 A1 | 2/2002 | Natarajan |
| 2002/0031240 A1 | 3/2002 | Levy et al. ................. 382/100 |
| 2002/0076048 A1 | 6/2002 | Hars .......................... 380/205 |
| 2002/0095579 A1 | 7/2002 | Yoshiura et al. ............ 382/100 |
| 2002/0122568 A1 | 9/2002 | Zhao |
| 2002/0199106 A1 | 12/2002 | Hayashi ..................... 713/176 |

OTHER PUBLICATIONS

Aura, "Practical Invisibility in Digital Communication," Information Hiding, First Int. Workshop Proc. May 30–Jun. 1, 1996, pp. 265–78.

Boland et al, "Watermarking Digital Images for Copyright Protection," Fifth International Conference on Image Processing and its Applications, Conference Date Jul. 4–6, 1995, Conf. Publ. No. 410, p. 326–330.

Friedman, "The Trustworthy Digital Camera: Restoring Credibility to the Photographic Image," IEEE Transactions on Consumer Electronics, vol. 39, No. 4, Nov., 1993, pp. 905–910.

Komatsu et al., "A Proposal on Digital Watermark in Document Image Communication and Its Application to Realizing a Signature," *Electronics and Communications in Japan*, Part 1, vol. 73, No. 5, 1990, pp. 22–33.

*Komatsu et al., "Authentication System Using Concealed Image in Telematics,"* Memoirs of the School of Science & Engineering, Waseda Univ., No. 52, 1988, pp. 45–60.

Gerzon + Craven, A High–Rate Buried–Data Channel for Audio CD, J. Audio Eng. Soc., Jan./Feb., 1995, pp. 3–22, vol. 43, No. 1/2, New York.

Lacy, Quackenbush, Reibman, Shuk + Snyder, On Combining Watermarking With Perceptual Coding, IEEE ICASSP Symposium, May 1998, Seattle, WA, USA.

Petitcolas + Anderson, Evaluation of Copyright Marking Systems, IEEE Multimedia Systems Symposium, Jun. 7–11, 1999, Florence, Italy.

Matsui et al., "Video–Steganography: How to Secretly Embed a Signature in a Picture," IMA Intellectual Property Project Proceedings, Jan. 1994, vol. 1, Issue 1, pp. 187–205.

Bender, "Techniques for Data Hiding," Proc. SPIE, vol. 2420, Feb. 9, 1995, pp. 164–173.

Boney, et al., "Digital Watermarks for Audio Signals," IEEE Int'l Conference on Multimedia Computing and Systems, Jun. 1996, Hiroshima, Japan.

U.S. Appl. No. 60/101,851, filed Sep. 25, 1998, Levy.
U.S. Appl. No. 60/110,683, filed Dec. 2, 1998, Levy.
U.S. Appl. No. 60/114,725, filed Dec. 31, 1998, Levy.
U.S. Appl. No. 60/126,592, filed Mar. 26, 1999, Levy.
U.S. Appl. No. 60/123,587, filed Mar. 10, 1999, Levy.
U.S. Appl. No. 60/126,591, filed Mar. 26, 1999, Levy.
U.S. Appl. No. 09/404,292, filed Sep. 23, 1999, Levy.

Dittman et al., "Content–Based Digital Signature for Motion Pictures Authentication and Content–Fragile Watermarking," 1999 IEEE, pp. 209–213.

Lin et al., "Generating Robust Digital Signature for Image/Video Authentication," Proc. Multimedia and Security Workshop at ACM Multimedia '98, pp. 49–54, Sep. 1998, pp. 49–54.

Pitas et al., "Applying Signatures on Digital Images," Proc. IEEE Workshop on Nonlinear Signal and Image Processing, Jun. 1995, 4 pp.

Hirotsuga, "An Image Digital Signature system with ZKIP for the Graph Isomorphism," 1996 IEEE, pp. 247–250.

Seybold Report on Desktop Publishing, "Holographic Signature for Digital Images," Aug. 1995, 1 p.

Schneider et al., "A Robust Content Based Digital Signature for Image Authentication," 1996 IEEE, pp. 227–230.

Schneier, "Digital Signatures," BYTE, Nov., 1993, pp. 309–312.

Szepanski, "A Signal Theroertic Method for Creating Forgery–Proof Documents for Automatic Verification," Proceedings 1979, pp. 101–109.

* cited by examiner

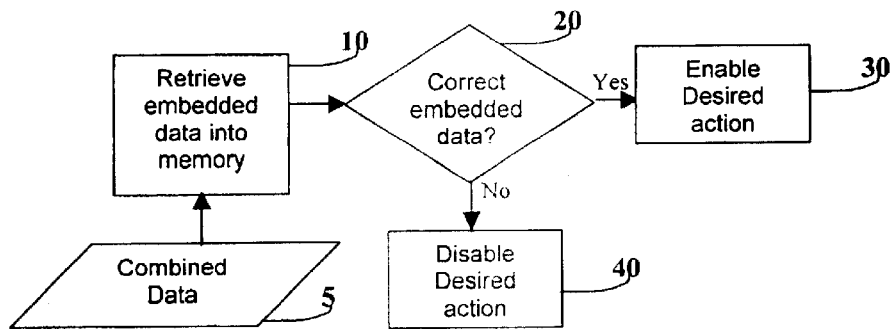
Fig. 1
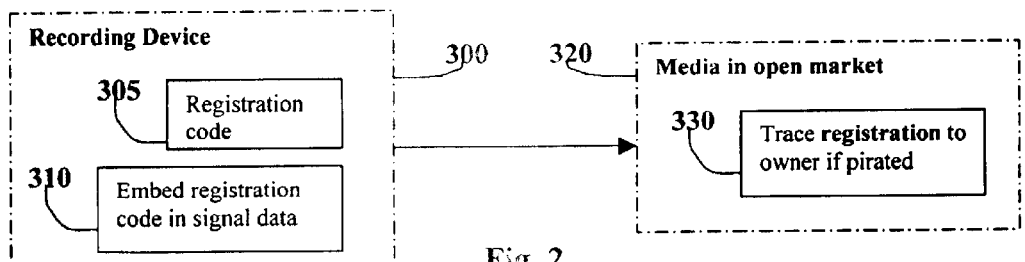
Fig. 2
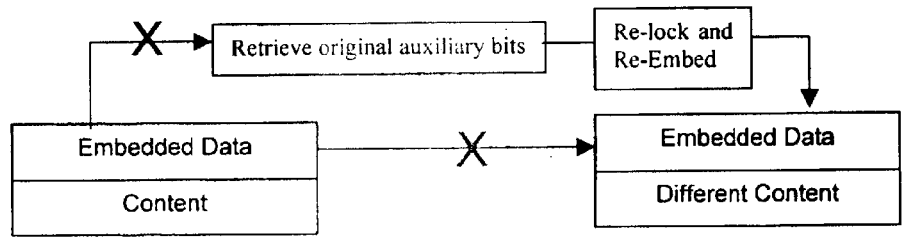
Fig. 3
| XOR | | |
|---|---|---|
| d | c | f(d,c) |
| 1 | 1 | 0 |
| 1 | 0 | 1 |
| 0 | 1 | 1 |
| 0 | 0 | 0 |
Fig. 4

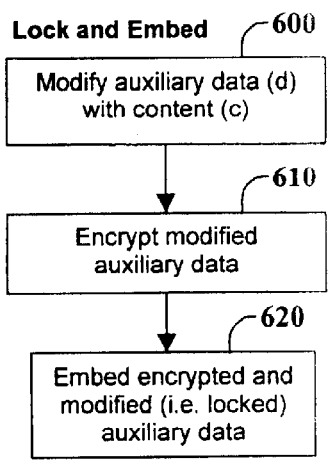
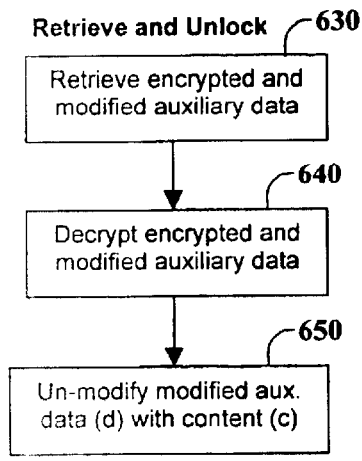
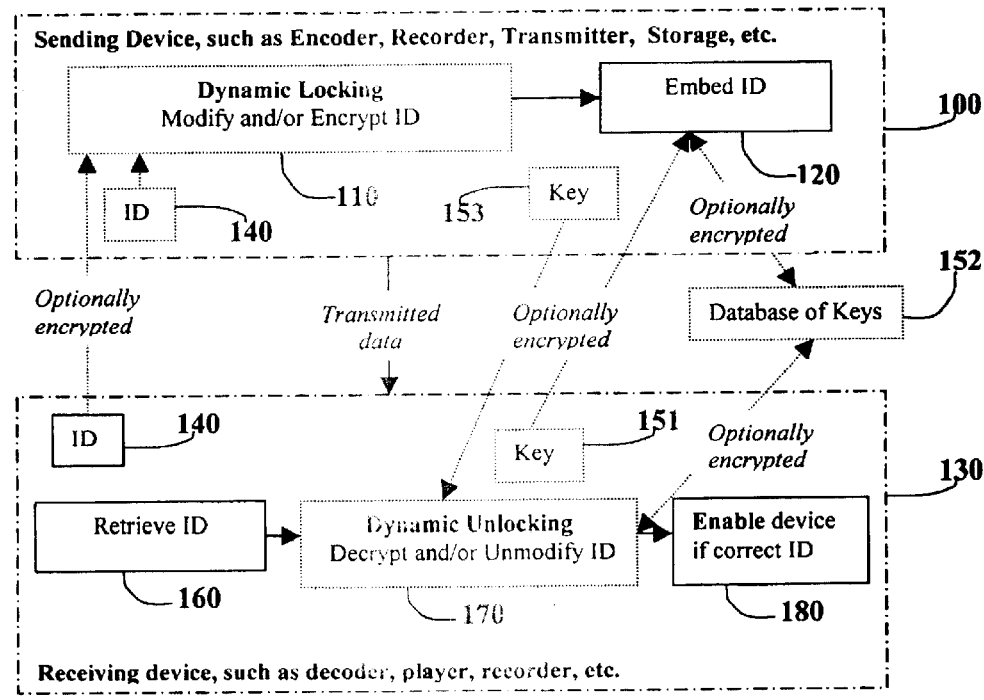

Modifying and unmodifying aux. data for patent application #60-101851

Modifying and unmodifying aux. data for patent #5,774,452

Modifying and unmodifying aux. data for methods based upon PN sequences

METHOD AND APPARATUS FOR ROBUST EMBEDDED DATA

This application claims the benefit of Provisional Patent Applications Ser. No. 60/101,851 filed Sep. 25, 1998, No. 60/110,683 filed Dec. 2, 1998, No. 60/114,725 filed Dec. 31, 1998, and No. 60/126,591 filed Mar. 26, 1999, incorporated herein by reference.

This application relates to Provisional Patent Applications Ser. No. 60/123,587 filed Mar. 10, 1999 and No. 60/126,592 filed Mar. 26, 1999, incorporated herein by reference. The application also relates to Utility patent application Ser. No. 09/404,292, filed on Sep. 23, 1999 (the same date as this application) entitled "Method and apparatus for embedding auxiliary information within original data" by the same inventor of this application, Kenneth L. Levy, incorporated herein by reference.

FIELD OF THE INVENTION

This invention relates to the field of signal processing, and more specifically, to techniques for hiding auxiliary information within original data.

BACKGROUND OF THE INVENTION

There are many techniques for embedding auxiliary information within original data, also known as watermarking or steganography. The original data consists of perceivable media, such as audio, video, stills, etc. It is usually desirable for the embedded data to be non-perceivable, but some content degradation may be okay for some configurations. Several good algorithms have increased the embedded data's ability to resist tampering and removal. One current use of embedded data in media is to include copy management information within the embedded data. Unfortunately, with copy management schemes presented in the prior art, if embedded copy management information is removed the original data is susceptible to illegal distribution.

Embedded data techniques are susceptible to removal of auxiliary information for either of the following reasons. First, the very nature of embedded data is incompatible with bit-rate reducing (a.k.a. compression) schemes, which remove the non-perceivable aspects of the data such as done with MPEG compression. Since a key feature of any embedded data is the fact that it is non-perceivable, compression schemes will act to remove the embedded data. Even if the embedded data is designed to survive the current compression technology, the next generation technology will probably remove it. Bit-rate compression schemes are very important in the digital distribution of media, and receiving much research. Second, noise reduction techniques will be able to remove embedded data. Noise reduction techniques are a hot topic, and used to restore old recordings. Since most non-perceivable embedded data is similar to noise, it will be removed by these noise reduction techniques. Again, even if the embedded data is designed to survive the current restoration technology, the next generation technology will probably remove it.

SUMMARY OF THE INVENTION

It is an object of this invention to increase the robustness of embedded data to attack. Attack is defined as getting around what the embedded data is supposed to provide or prevent. Attack may include duplication, which is defined as being able to replicate or impersonate the embedded data from one data segment to another. Attack may also include modification, which is defined as changing the embedded data for a desired affect, such as from "no copying" to "copying allowed".

This invention includes two preferred embodiments describing novel ways of using embedded data such that the embedded data is more robust to attack, labeled the enabling and registration process. In addition, multiple preferred embodiments improving the robustness of embedded data to duplication or modification are disclosed, labeled dynamic locking and unlocking.

The first preferred usage embodiment is the enabling process, which involves using embedded data to enable an action, such as copying, playing or otherwise rendering. Thus, if the embedded data is removed by attack, the end-user has gained nothing because the original data has become unusable. Improvements in this process occur when the embedded data is robust against duplication and modification.

The second preferred usage embodiment is the registration process, where the recording device embeds its registration in the data. In this embodiment, the recording device can refer to a physical device, such as a CD or DVD burner, or virtual device, such as an MP3 or AAC encoder. This registration process allows any illegal media to be traced back to the original owner assuming that recording devices are registered when purchased. At the very least, the illegal media could be traced back to the specific recording device's place of purchase, providing law enforcement with a good starting point.

The dynamic locking and unlocking preferred embodiments improve the robustness of existing or future embedded data techniques to duplication and/or modification. Dynamic locking causes the embedded data to be dependent upon the media by including one or both of the following steps. The first step includes modifying the auxiliary information by the media. The second step includes encrypting the auxiliary information, possibly modified in the first step. The encryption technique could be RSA, DES or any appropriate algorithm. After dynamically locking the auxiliary information, it is embedded in the original data. Each step of dynamic locking provides its own independent advantages. However, incorporating both steps produces auxiliary information that cannot be transferred between media, modified, or created.

The dynamic unlocking process performs the inverse steps, assuming each specific step was performed in the dynamic locking process. The first step involves decrypting the retrieved data. The second step involves unmodifying the output of the first step or the retrieved data directly, depending upon whether the first step was performed, and thus producing the original auxiliary data.

Five example utilizations of the enabling and dynamic locking process and apparatus are described briefly here and in detail below to aid in the understanding of both processes and apparatus. These utilizations include (1) distribution of compressed media such that it can only be played by the requester's playback device, (2) using the presence of the embedded data to specify copy-once access, (3) protection of DVD media, (4) photo-card validation, and (5) sending secure secret messages.

In the first example utilization, a media player, such as a computer with MP3 software player, contacts an Internet site to download media, such as a song in MP3 format. The player sends its unique identifier to the Internet site, where the identifier is modified using the original data and the result is encrypted. The modified and encrypted identifier is then embedded in the original data, and the combined data is downloaded to the player. The media player is able to extract the identifier from the combined data, and compare it to its own identifier. If these identifiers are identical and any additional information, such as a date limit, is verified, the player will play the data. If the combined data is copied to a second player having a different identifier, the second player will not play the combined data.

If an unauthorized person were able to determine the identifier, he could then embed it in other songs and play them on his player. By encrypting the identifier, an unauthorized person would be unable to determine the identifier, even if he were able to extract the auxiliary data from the combined data. In addition, if the process did not include modifying the auxiliary information with the original information, the embedded data could be copied between media. Finally, the encryption key also requires proper handling, and the identifier may include additional information besides the player identifier.

An example of the second utilization includes, rather than a unique identifier, a predefined copy code such as "allow no copying", "allow copying one time, but not copying of a copy", and "allow unlimited copying". The recorder would retrieve the copy code and not copy unless permitted by the code. The copy would either contain no "allow copying one time . . . " code, or contain an "allow no copying" code. For broadcasts, both the player and the broadcast unit would know the code beforehand (i.e. predefined) or the code would be included in the broadcast.

In the third example utilization, two approaches are described. In the first approach, a DVD player will not play the DVD without retrieving the predefined identifier embedded in the original data. For extra security the identifier could be encrypted with a key located at a central database or in a section of the DVD not available for copy. In the second approach, the identifier could control the number of generation of copies allowed, noting that if no identifier exists, no copies can be made. Or, there could be two layered identifiers for both types of copy management.

The fourth example utilization involves embedding secure data in the picture of a photo-card, as in a photo used for identification purposes like a driver's license or credit card. If the retrieved information at the photo-card reader does not match that of the central database, the card is a fake and will not be authorized for use. Note that the information and key exchange must be securely transmitted.

The fifth example utilization allows the secure transmission of secret information, hidden in the media. Most bystanders will not know the secret message is attached. If found, the hidden information cannot be read by, modified by, and/or transferred to other media by an imposter when the embedded data is dependent upon the media and encrypted. Different types of encryption, symmetric or public/private key, can be used for creating the desired protection or authentication of the embedded data. This hidden information enables a person or machine on the receiving side to perform an action.

The apparatus for these processes involves a logic processor, possibly including DSP chips, host CPUs or custom analog or digital circuitry, and memory. The configuration and machine code for this invention are easily designed given this disclosure and familiarity with the state of the art in cryptology and electrical engineering.

BRIEF DESCRIPTION OF THE DRAWINGS

FIG. 1 shows the block diagram for the enabling process.

FIG. 2 shows the block diagram for the registration process.

FIG. 3 demonstrates the way in which dynamic locking blocks the duplication of the auxiliary data.

FIG. 4 displays the input and output for an exclusive-or (XOR) function.

FIG. 5A displays an overview of the process of dynamic locking and embedding of the auxiliary data.

FIG. 5B displays an overview of the process of retrieving and dynamic unlocking of the auxiliary data.

FIG. 8 shows the basic process behind the example utilizations. The dotted boxes are optional. The dashed boxes group similar items. In addition, although three key locations are shown, usually only one key is used and its location depends upon the utilization requirements. Finally, the abbreviation ID is used and many times refers to an identifier, but can also refer to any auxiliary information.

DETAILED DESCRIPTION

We begin with some definitions. Media or content includes, but is not limited to, audio, video, still images, combinations of the above, and forms related to other senses. The terms media and content are used interchangeably. Media does not refer to a storage medium. A media or content segment includes, but is not limited to, a song, part of a song, movie, part of a movie, part or all of a sound track, part or all of a still image, a taste, a touch, and an odor. Original data is the raw, unprotected data. The auxiliary information refers to any data that is to be embedded in the original data. The ID 140 in FIG. 8 refers to this auxiliary information, and may include but is not limited to, information such as the player ID, number of copies allowed, usage time or date limits, and content enhancement information such as author, copyright, publisher, song lyrics or image details. The embedded data is the data that is actually embedded in the original data. The embedded data differs from the auxiliary data by the transformation used in the embedding process. This transformation can include the modifying process and/or encryption involved in dynamic locking, and the embedding process such as bit manipulations, pulse-width modulation, or spreading with frequency transformation or pseudo-random noise sequence. The combined data results from adding the embedded data to the original data. Robustness to attack is defined as getting around what the embedded data is supposed to provide or prevent. Finally, a pirate is a person who tries to illegally obtain the data or use the protected device.

Enabling Process

Figure 9:
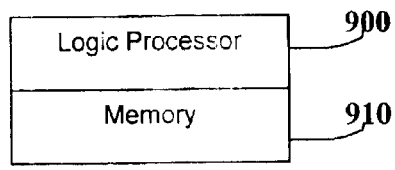
FIG. 9 shows the apparatus for these robust data embedding techniques.

FIG. 1 demonstrates the enabling process, which is the first preferred usage embodiment of the invention. This process requires using a logic processor 900 and memory 910, as shown in FIG. 9. First, as shown in box 10, processor 900 retrieves the auxiliary data from the combined data 5 and stores it in memory 910. Then, processor 900 determines whether the embedded data allows the desired action, as shown in box 20. If so, the desired action is allowed, as shown in box 30. If not, the desired action is disallowed, as shown in box 40.

Registration Process

FIG. 2 demonstrates the registration process, which is the second preferred usage embodiment. This process involves assigning a unique registration code 305 to each recording device 300, and embedding the registration code 305 into the media when it is recorded, as shown in box 310. Then, when illegal media is found in an open-market 320, it can be traced to the owner of the recording device via the registration code 305, as shown in box 330.

The process is similar to gun registration assuming the recording device is registered upon purchase. At the very least, the illegal media could be traced back to the recording device and its place of purchase, thus aiding law enforcement.

This recording device may be a physical device or virtual device. A physical device could include a CD or DVD burner. A virtual device could include a software program using processor 900 and memory 910 to digitally compress (bit rate reduce) audio, such as a MP3 ripper or AAC encoder. Remember that media refers to the perceived data and not the storage medium.

Dynamic Locking

FIG. 3 displays the way in which dynamic locking blocks the duplication of the auxiliary data. Duplication is blocked for both bit-for-bit copying of the embedded data between content, and retrieving the embedded information, and re-embedding it into different content, such that the different content appears authentic.

Specifically, when only modifying the auxiliary information, a pirate will not be able to move the embedded data from one media segment to another without figuring out how to correctly unmodify and re-modify the embedded data. When only encrypting the auxiliary information, a pirate will not be able to obtain the auxiliary information. The pirate will be able to retrieve the embedded data, but not decipher it since it is encrypted. When both steps, the auxiliary information cannot be moved from one media segment.to another. If it is moved directly, the modification step of dynamic locking causes the embedded data in the new media to be incorrectly unmodified because the values in the new media segment used for unmodifying the retrieved data don't match the values in the original media where the data was modified. If the pirate tries to unmodify and re-modify the embedded data (since the details of this step may be known), he/she must first have the key to decrypt the data in order to move it to new media segment.

FIG. 4 displays the input and output for the exclusive-or function (XOR). The XOR is its own inverse and extremely efficient.

FIG. 5A displays an overview of the dynamic locking and embedding process. The whole process contains three steps, but either one (not both) of the first two steps, i.e. those steps of dynamic locking, can be skipped. However, when both dynamic locking steps are performed the difficulty in duplicating the data is improved. In addition, the order of the last two steps can be switched. This switch is beneficial when the content, including the embedded data, is encrypted, usually for other content protection reasons, or when the modification step has some of the desirable features such as requiring a key to be unmodified.

In the first step, box 600, the auxiliary data (d), which is to be embedded, is modified based upon the original content (c). This step is designed to modify the auxiliary data to be dependent upon the original content such that the embedded data cannot be copied bit-for-bit between content. The chosen content bits should be critical to the content, such that they cannot be changed in new content to make it appear authentic. A desirable function is the exclusive-or (XOR) operator since this function is its own inverse and efficiently implemented on digital processors.

In the second step, box 610, the modified data is encrypted such that the original auxiliary bits cannot be obtained from the embedded data. Thus, the original auxiliary bits cannot be re-embedded in different content, making this different content appear authentic. If the auxiliary data is not modified by the original content before being encrypted, it could be copied bit-for-bit from the original content to new content making the new content appear authentic. Any existing or future methods of encryption, including DES and RSA, can be used, with known methods of key management, all of which is well described in the prior-art.

In the third step, box 620, the encrypted and modified (labeled dynamically locked) auxiliary data is embedded into the original content.

FIG. 5B displays an overview of the process used to retrieve and dynamically unlock the auxiliary data. The whole process contains three steps, and each step should only be performed if the corresponding step was performed when the data was embedded. In addition, if the order of the last two steps was switched while embedding, these two corresponding steps should be switched during this retrieval process.

In the first step, box 630, the embedded data is retrieved from the content. At this time, the embedded data consists of encrypted and modified auxiliary data (assuming both dynamic locking steps were performed). In the second step, box 640, the retrieved data is decrypted. In the third step, box 650, the output of step two is unmodified. The result is the original auxiliary data.

In addition, dynamic locking and unlocking can use correlated data. Correlated data may include information such as song lyrics or the address of the person in a photographic identification card.

FIGS. 6 shows several example implementations of the modification part of dynamic locking and unlocking when data is embedded such that it will not be perceived (i.e. watermarking). Although, only the modification part is shown in FIG. 6, the modified auxiliary information may be encrypted before being embedded and decrypted after being retrieved (but before being unmodified), if desired. In addition, the modification of the auxiliary information may be skipped, and the auxiliary information may be only encrypted before being embedded and decrypted after being retrieved. The cryptology process is not discussed in detail since someone familiar with the state of the art easily understands its implementation.

Figure 6A:
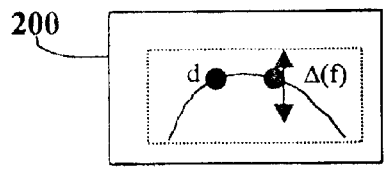
FIG. 6A shows the modification step of dynamic locking for locally masked embedded data.

FIG. 6A shows dynamic locking and unlocking as applied to a utility patent application "Method and apparatus for embedding auxiliary information within original data" filed simultaneously with this application on Sep. 23, 1999 by the same author, Kenneth Levy, incorporated herein by reference. For dynamic locking, the peak value, box 200, or threshold crossing value, is used in the exclusive-or (XOR)

calculation to modify the next N auxiliary information bits, where N is the number of bits per sample in the data (such as 16 bits for CD audio). Then, these modified N bits of the auxiliary information are optionally encrypted and embedded by the method described in the reference patent-pending application using locally masked bit manipulations of difference Δ. This process is repeated for the next group of N peaks, and so on, until the whole modified auxiliary information is embedded or all the original data has been used with modified auxiliary information being repetitively embedded.

The embedded data can be retrieved using the process described in the referenced patent application, decrypted (if required), and unmodified. The unmodifying process is the inverse of the modifying process. Since the XOR function is its own inverse, the peak values of the combined data and the decrypted auxiliary information are applied to the XOR function. Importantly, the peak values are identical to those of the original data since they were not changed during the embedding process.

For example, when using CD-audio, N is 16 bits. Thus, for this example, the first 16 bits of the auxiliary information are modified by the first peak value using the XOR. Then, these modified auxiliary information bits are optionally encrypted and embedded in the data points after the current peak and the next 15 peaks. This process is repeated for the following group of 16 peaks and auxiliary information bits, and so on, until all the data is embedded or all the original data has been used. The modified and optionally encrypted auxiliary information can be embedded over an over again within the data, by restarting the process with the first 16 bits of the auxiliary information after all of the bits have been embedded.

The embedded data can be retrieved, decrypted (if encrypted), and unmodified with the inverse of the XOR calculation, which is an XOR calculation. Thus, the first original 16 bits of the auxiliary information can be obtained by performing the XOR calculation with the retrieved and decrypted embedded data and first peak value. The retrieving process is continued for the next group of 16 peaks of the combined and embedded data, and so on, until the whole auxiliary information is found or all of the combined data has been traversed.

It is very important to keep proper track of the position of the groups of 16 bits in the auxiliary information when modifying for embedding, and unmodifying after retrieving.

The related patent application also allows sync pulses in the combined data. These sync pulses can be used to align the auxiliary information with the value used in modifying the auxiliary information. For example, rather than embedding data after the peak used to modify the auxiliary information, a sync pulse could be embedded and used for re-alignment during the retrieval process.

Figure 6B:
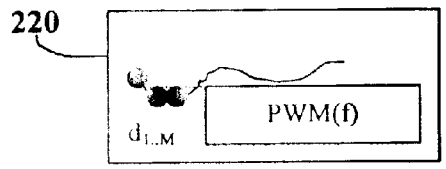
FIG. 6B shows the modification step of dynamic locking for pulse width modified (PWM) embedded data.

FIG. 6B shows dynamic locking and unlocking as applied to U.S. Pat. No. 5,774,452 "Apparatus and method for encoding and decoding information in audio signals" by Jack Wolosewicz of Aris Technologies, incorporated herein by reference. For this case, the data values occurring previously in time to the embedding of the pulse-width modulated (PWM) bit stream and shown in box 220, could be used in an XOR operation with auxiliary information to modify and unmodify the embedded data. In this case, several data values would need to be used to modify all of the auxiliary information. For example, when using 16 bit data and embedding 256 bits of auxiliary information, the dynamic locking and unlocking process would use the previous 16 original data points to modify all of the auxiliary information. As long as the data is received in the same order as it was embedded, it does not matter if the data values used to modify the auxiliary information overlap with the previous embedded bit stream. If one finds an configuration where the above does matter, it can easily be handled by skipping the second embedded bit stream and marking it as skipped in the combined data.

Figure 6C:
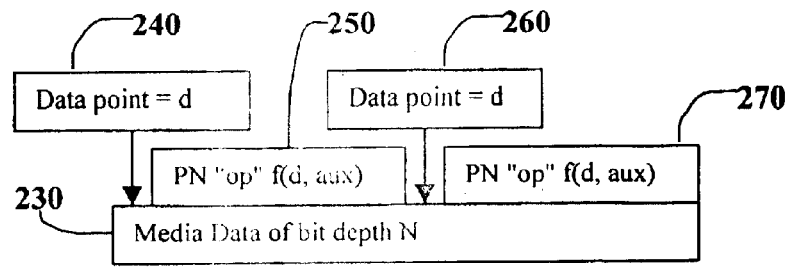
FIG. 6C shows the modification step of dynamic locking for inventions based upon PN sequences. Auxiliary data is abbreviated as aux.

FIG. 6C shows an overview of applying dynamic locking and unlocking to embedded data schemes based upon pseudo-random noise (PN) sequences. In one embodiment, the PN sequence could skip the $M^{th}$ data point, as shown in boxes 250 and 270, where M is equal to the number of bits per sample in the data (N) times the length in bits of PN sequence segment applied to each auxiliary information bit. This $M^{th}$ data point would be used in an XOR operation with b bits of the auxiliary information to modify the auxiliary information. For example, lets assume each auxiliary information bit is embedded with a 1024 bit segment of the PN sequence in 16 bit audio and the auxiliary information is 64 bits long. Then, after adding the PN sequence to 16384 (M=1024 bit PN segment*16 bit audio) bits of original data, another original data point is skipped to modify the auxiliary information. It will take 4 (64 bit auxiliary information/16 bit audio) of these segments to embed each auxiliary information. Equivalently, 4 adjacent original data points could be skipped every 65536 (1024 bit PN segment*16 bit audio*4 PN segments) original data points and embed the whole modified auxiliary information in one continuous stream of four PN segments.

This modified and optionally encrypted auxiliary information will be used to control the fashion in which the PN sequence is added to the original data, as well known in the state of the art of spread spectrum technology. Specifically, in many applications, the PN sequence will be phase shifted by the modified auxiliary information (i.e. where 0 scales and adds the negative value of the PN sequence and 1 scales and adds the positive value) or simply multiplied by the auxiliary information. Once retrieved, the modified auxiliary information could be unmodified using the inverse XOR calculation with the skipped data point.

Another embodiment for PN sequences is using the skipped data point to modify the next N bits of the PN sequence, not the auxiliary information. If one point is skipped, the number of PN bits modified, M, should be equal to N, the number of bits in the data. If two points are skipped, M is equal to 2*N, and so on. Modifying the PN sequence using an XOR calculation and optional encryption is one scheme. However, this may reduce the randomness of the PN sequence, and other modification functions can be employed to maintain randomness. Finally, the modified and optionally encrypted PN sequence is embedded in the media data and used to retrieve the embedded data.

In a final implementation of dynamic locking, it is applied to embedding methods that use PN sequences to determine where to place the auxiliary information in the original data, possibly after being transformed into the frequency domain. Such methods include that of patents U.S. Pat. Nos. 5,613,004 and 5,687,236 "Steganographic method and device" by Marc Cooperman and Scott Moskowitz of the Dice Company, incorporated herein by reference, and patent-pending technology of AT&T labs (Lacy J, Quackenbush S R, Reibman A R, Shur D, Snyder J H. (1998) "On combining watermarking with perceptual coding." ICASSP'98 Seattle, Wash.), incorporated herein by reference. For these methods, the PN sequence used to embed the data could be required to never have more than N continuous embed bits and start with a non-embed bit, where N is again the number of bits per sample in the original data. Then, the original data point adjacent and previous to the first embed bit modifies the next N bits of the auxiliary information. This process may be repeated until all the original data is embedded, such that the modified auxiliary information is embedded repetitively. For example, when embedding in the frequency domain from low to high frequency with 16 bit data and a 32 bit auxiliary information, the non-embed bit in the frequency bin just below first embed bit is used to modify the next 16 auxiliary information bits. Then, the non-embed bit in the frequency bin just below the $17^{th}$ embed bit is used to modify the next 16 auxiliary information bits. Next, the non-embed bit in the frequency bin just below the $33^{rd}$ embed bit is used to modify the first 16 auxiliary information bits, and so on.

In a similar scheme, the PN sequence could be applied to every other or $k^{th}$ (where k<N bits per sample in original data) data point, such that no limitations need be applied to the PN sequence. The process guarantees to have a non-embed bit next to the $N^{th}$ embed bit, and is implemented is similar fashion the previous method.

For all these methods of dynamic locking using PN sequences, the dynamic unlocking process is the inverse and obvious to a person familiar with the art given the previous disclosure.

Figure 7A:
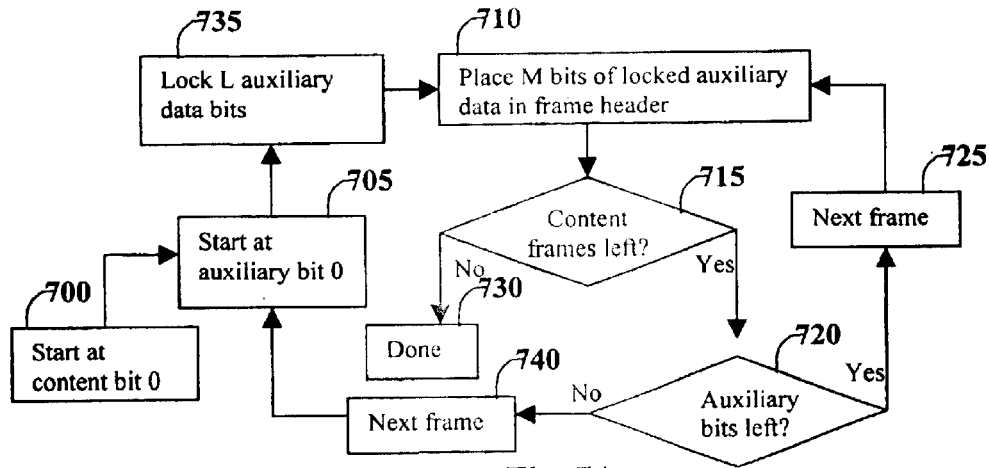
FIG. 7A displays the pseudocode in the form of a flowchart for locking and embedding the auxiliary data using header blocks.

FIG. 7 demonstrates applying dynamic locking and unlocking to data embedded in header, not content, data. FIG. 7A displays the pseudo-code for the dynamic locking process. In general, the auxiliary data bits, of length L, are locked and placed in the header of frames of the content and repetitively embedded.

Specifically, the process of FIG. 7A starts at the beginning of the content bits (box 700) and auxiliary data bits (box 705). Then, L auxiliary data bits are locked by being modified with L bits of the content using the XOR or applicable function, and/or encrypted (box 735). These L content bits should be critical to the either or both file format and content, such that they cannot be replicated in a different media segment without disturbing it. Next, M bits of locked auxiliary data are embedded in the frame header (box 710). These M bits should be less than L, and preferably L is divisible by M, such that the L bits are embedded in L/M frame headers. If L is not divisible by M, a person familiar with the state of the art can easily handle the offset. Then, the content is checked to see if more frames exist (box 715). If there are no content frames left, the process is completed (box 730). If there are more content frames, the auxiliary data is checked to see if any previously modified bits exist (box 720). If there are previously modified auxiliary bits left, the next frame is read (box 725), and the process is continued at box 710. If there are no previously modified auxiliary bits left, the next content frame is read (box 740), the auxiliary data is re-started at bit 0 (box 705), and the process is continued at box 710.

This process assumes the auxiliary information is of length L and L is reasonably short for ease of explanation. It is obvious that if you have a very large number of auxiliary bits, you can break them into segments of length L, and rather than starting at the first auxiliary bit each time, start at the $k^{th}$ segment. To this end, the auxiliary bits are embedded within the data, broken into segments of length L and each segment is embedded in L/M frame headers.

To increase robustness to attack, a pseudo-random noise (PN) bit sequence could be used and the first N critical content bits with a corresponding PN bit value of 1 could be used for modifying the auxiliary information.

Alternatively, only the first important M content bits in each frame, rather than L bits every L/M frames, are used in the XOR calculation when embedding M locked auxiliary data bits in each frame. In this case, the auxiliary data bits are modified in each frame, specifically, between boxes 725 and 710 in FIG. 7A. Once again, a PN sequence could be used to randomize which M bits of original audio are used. Importantly, M must be large enough so that error correction in new content cannot repair all the content bits that need to be changed, such that a bit-for-bit transfer of the auxiliary data makes the new content appear authentic. The value of M depends upon the frame size and desired bit rate.

When using compressed content, such as MPEG data, specifically Layer III (MP3) or AAC audio as specified in the MPEG2 specifications, including the MPEG 1 and 2 specifications, ISO 11172-3 and ISO 13818-7 respectively, herein by reference, the frames and header bits are pre-defined. The private, copyright, or ancillary bits can thus be used to embed the data. When using content without pre-defined frames, such as in raw PCM audio, databases, or software applications, the frames can simply be created. For example, the content could be arbitrarily divided into 1024 bit frames with header bits for the embedded data.

Alternatively, the locked auxiliary data could be placed only in the global header, defined as the header for the complete file, or in a linked but separate file. These two cases are less secure than embedding the data throughout the file. More bits mean the data will be more robust to attack via brute force. For broadcast content, the data should be embedded throughout the content as described above so the rendering device or person can receive the auxiliary information and respond accordingly from any point in the broadcast.

Figure 7B:
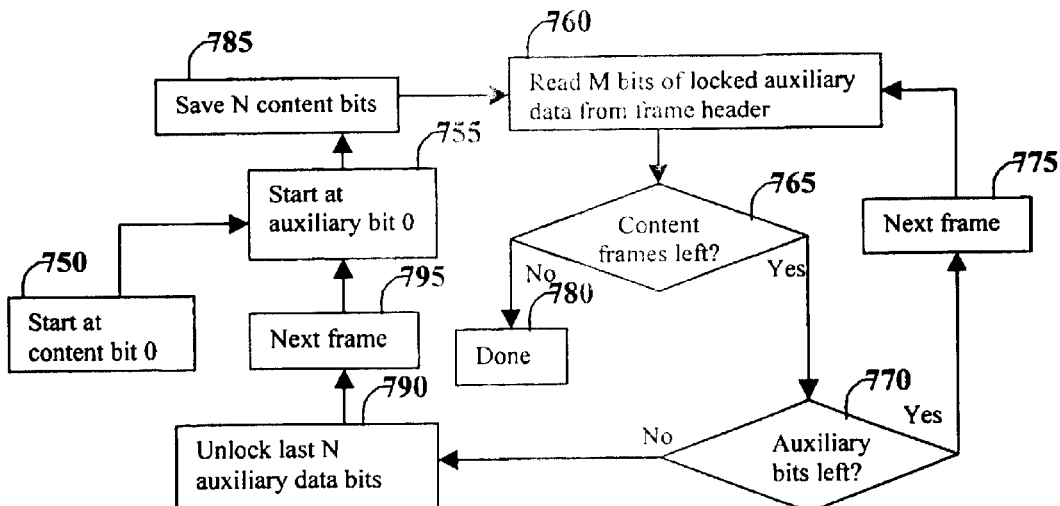
FIG. 7B displays the pseudocode in the form of a flowchart for retrieving and unlocking the auxiliary data using header blocks.

FIG. 7B displays the pseudo-code for the retrieval and dynamic unlocking process for the auxiliary data embedded in FIG. 7A. In general, the auxiliary data bits are retrieved by reading them from the header of the content frames and unlocking them, in a repetitive manner.

Specifically, the process of FIG. 7B starts at the beginning of the content bits (box 750) and auxiliary data bits (box 755). Then, N content bits are saved, such as in memory 910 of FIG. 9, so they can be used to unlock the next N retrieved auxiliary data (box 785). Next, M bits of locked auxiliary data are read from the frame header (box 760). Then, the content is checked for existing frames (box 765). If there are no content frames left, the process is completed (box 780). If there are content frames left, the auxiliary data bits are checked to see any exist (box 770). If there are auxiliary bits left, the next frame is read (box 775), and the process is continued at box 760. If there are no auxiliary bits left, the retrieved auxiliary data is unlocked (box 790), the next frame is read (box 795), the auxiliary data is re-started at bit 0 (box 755), another N content bits are saved (box 785) and the process is continued at box 760.

For this example, unlocking the retrieved embedded data (box 790) involves performing an XOR operation (since it is its own inverse) on the N content bits that were saved in box 785 and the last N retrieved embedded data bits, and decrypting, if required. In addition, since the data is repetitively embedded in each frame, the retrieving process must overlay the auxiliary data bits after the last bit as received (box 790) and make sure the auxiliary data bits do not change throughout the file. If the auxiliary data bits change throughout the file, the file is not authentic.

Alternatively, if another modification function was used, its inverse should be used. Importantly, the same retrieved auxiliary bits and original content bits should be used in the inverse calculation as were used in the modifying calculation. For the embedding example where the first M audio bits of the frame were used to modify the auxiliary data, the first M audio bits of the frame should be used to unmodify the modified auxiliary data, which was retrieved and decrypted. If a PN sequence was used to modify the auxiliary data, the same PN sequence should be used to unmodify the data.

If an alternative embedding step was used, the auxiliary bits are retrieved accordingly. For example, if bits are embedded in the global header or linked file, the are read from the global header or linked file, respectively.

Finally, the appropriate steps should be taken if the auxiliary data is longer than L or L is not divisible by M. These steps are obvious to a person familiar with the state of the art given the above explanations about dynamic locking and unlocking.

Example Utilization

These five example utilizations are described to aid in understanding the enabling and dynamic locking process and apparatus. The general underlying process for these examples is displayed in FIG. 8 and the corresponding apparatus is shown in FIGS. 9 and 10. The process, in general, begins with a sending device 100, dynamically locking an ID 140 as shown in box 110, and embedding the locked ID within the media as shown in box 120. Remember, as defined at the beginning of this section, the term ID usually refers to an identifier, but can include any auxiliary information. The sending device 100 may be an encoder, recorder, transmitter, storage medium, or the like.

The media is then transmitted to a receiving device 130 in which the locked ID is retrieved as shown in box 160, and dynamically unlocked as shown in box 170. Then, the proper action is enabled if allowed by the retrieved ID 140, as shown in box 180. The receiving device 130 may be a decoder, player, recorder, and/or the like.

When the dynamic locking and unlocking processes include encryption and decryption, the encryption key must be located somewhere and transmitted safely, as shown in boxes 151, 152, and 153. Transmitting the key safely is well understood by one familiar with the state of the art in cryptology. The location of the key depends upon the requirements of the utilization. The five utilizations demonstrate various key locations. For most utilizations, the key will be available only in one of the three possible locations. In addition, the encryption and decryption key will usually be identical (symmetric), and referred to as the encryption key in the discussion below. However, public/private key encryption could also be used in many of these situations. When discussing private/public encryption below the key will be specified as the public or private encryption key. Finally, certain utilizations may not need to transmit the auxiliary information since the values are predefined.

In addition, the use and location of ID 140, the types of sending devices 100 and receiving devices 130 are also explained in more detail in these example utilizations.

The five example utilizations include distribution of MP3 data, copy-once access to broadcast data, DVD copy protection, photo-card verification, and secret data transmission. From these explanation, many more utilizations are obvious.

Regarding distribution of MP3 data, the concept is explained using several scenarios. All scenarios include both a software PC-based and portable MP3 audio player, and distribution via the Internet.

In the first scenario, the MP3 data exists on the Internet and is purchased by an end-user. The delivery system interacts with the end-user's player, securely transmitting ID 140 and the encryption key, shown in box 151, from the receiving device to the sending device, and dynamically locking, including encryption, the ID 140 in the MP3 data. In this scenario, the encryption key, shown in box 151, is located on the end-user's player. After the MP3 file is delivered (i.e. downloaded) only the end-user's player can play the data since other players will have different IDs. A portable and PC-based player may share the ID 140, and this is easily implemented by a software program and current digital electronics, such as EPROM or flash memory. Since the ID 140 is dynamically locked the end-user cannot extract the ID 140 and use it in another song or MP3 file.

In another scenario, the MP3 encoder and player may be part of one software program, which transforms CD, DVD or broadcast audio into MP3 audio with the embedded data containing the dynamically locked, including encryption, ID 140. In such an example, there is no need for the exchange of an encryption key, as displayed in box 151, and ID 140. The software applications should be programmed such that the key and ID 140 are protected from the end-user, as well known in the state of the art in software. Again, the key, shown in box 151, is located within the end-user's player. The transformed MP3 audio is now only playable on the end-user's system and/or portable player, and it is not possible to move the ID 140 to another song as described above.

In yet another scenario, the key could be located in a central database, as shown in box 152. This configuration allows a different key for each player and MP3 audio sample. This configuration increases robustness to attack since new keys are used for each song, but involves extra management tools and responsibilities.

In a final scenario for MP3 audio, the ID 140 could contain time limits for listening to the audio or a date limit that, when exceeded, the audio will not play. The player will keep track of how many times the song has been played or whether the date has expired. The ID 140 could contain a demo code, which does not limit the song to one player.

Regarding copy-once access (defined as allowing an end-user to copy the media only once, perhaps for time shifting purposes), the concept is explained in terms of the broadcast of a movie. With broadcast media, it is best if everyone shares the same encryption key. The key, as shown in box 153, could be broadcast embedded in the movie, and changed for each broadcast. In addition, if the embedded data is not encrypted, there is no need for a key, thus simplifying transmission. Finally, the copy-once ID 140 will be predefined, meaning that it is already defined in the transmitting and receiving device, as shown in FIG. 8 where ID 140 has an optional location in the transmitting device. Once the broadcast is received and the retrieved ID 140 enables the data to be recorded, the recorder can record the movie and either remove the copy-once ID 140 or change the ID 140 to a predefined code that informs other recorders that the media has been copied once.

Regarding DVD copy protection, there are two scenarios. In the first scenario, the player will not play the media unless the embedded ID enables the action. The encryption key, as shown in box 153, is be included on the DVD in a non-copy access location. This means the user will be able to play the media only when the DVD disk is present since the player will not play the DVD data without retrieving the correct ID. A copy of the entire DVD (minus the encryption key since it is unable to be copied) or a copy of a content file will be unusable since the key to decrypt the embedded data will not be found and without it the player will not work.

In addition, the key could be located in a centrally accessible database, and possibly linked to the requesting end-user player, as shown in box 152. This configuration increases robustness to attack since access to the key is monitored, but includes extra management responsibilities for the content provider and additional time for the end-user. The key could also be purchased and encrypted by the key in your player as described in patent-pending technology by Paul Schneck (incorporated herein by reference). Once again, the ID 140 will be predefined, and exist in the sending device 100.

In a different scenario, the predefined ID 140 could be used to enable the recorder, and allow a certain number of copy generations, or a copy of only the original, known as serial copy management. ID 140 could be modified to allow one less recording generation each time the DVD is recorded. Possibly through keeping track of the recorded generation and originally allowed count or by reducing the allowed count. For serial copy management, the watermark could be removed in the second generation DVD. Remember that in this approach if the watermark does not exist, no copies can be made. Finally, there could be two-layered ID 140s for both types of copy management.

The photo-card utilization example involves having the picture in the photo-card embedded with the ID 140. If the correct information is not present, the card is a fake and will not be authorized for use. To increase the security of the method dynamic locking is applied; the ID 140 is reversibly modified by the photograph or connected data such as the corresponding name and address, and encrypted, such that the information cannot be copied between cards or from a legitimate card to an illegal card. The matching ID 140 and encryption key can be stored at a database only accessible by every sending device (i.e. in the sending device) and securely transmitted between the database and the photo-card reading device, such as using RSA key exchange or any other method known in the state of the art of cryptology. Besides being as secure as other cryptology techniques, another advantage of this process is that it requires transmission of minimal data, including the short ID 140 and encryption key.

The last example utilization allows the secure transmission of secret information in ID 140, hidden in the media. Most bystanders will not know the secret message is attached. Once the receiving device extracts the hidden message, the receiving device, a connected device, or a human will be enabled by the hidden information contained in ID 140. If found, the hidden information can be protected from being moved to other media segments and/or interpreted by using dynamic locking with various encryption schemes. For example, if the secret information is encrypted with your public key, only you can recover it. Or if it is encrypted with your private key, people or devices receiving the message using your public key know it was signed by you and is authentic. If it is encrypted with a symmetric key, only the holders of the key could have created and read the message. Finally, if the modification step of dynamic locking is used, the receiver knows the message was not transferred from a different media segment.

Apparatus

FIG. 9 shows the hardware apparatus required to implement the enabling, registration, and dynamic locking processes. The hardware includes a logic processor 900 and memory 910. The logic processor 900 may be defined as the equivalent of a digital signal processor (DSP), general-purpose central processing unit (CPU), or a specialized ASIC chip. A likely DSP chip is one of the Texas Instruments TMS320 product line. A CPU could include one of Intel's Pentium line or Motorola/IBM's PowerPC product line. The design is straightforward for someone familiar with the state of the art given the description of these processes. The memory 910 includes any type of memory.

Figure 10A:
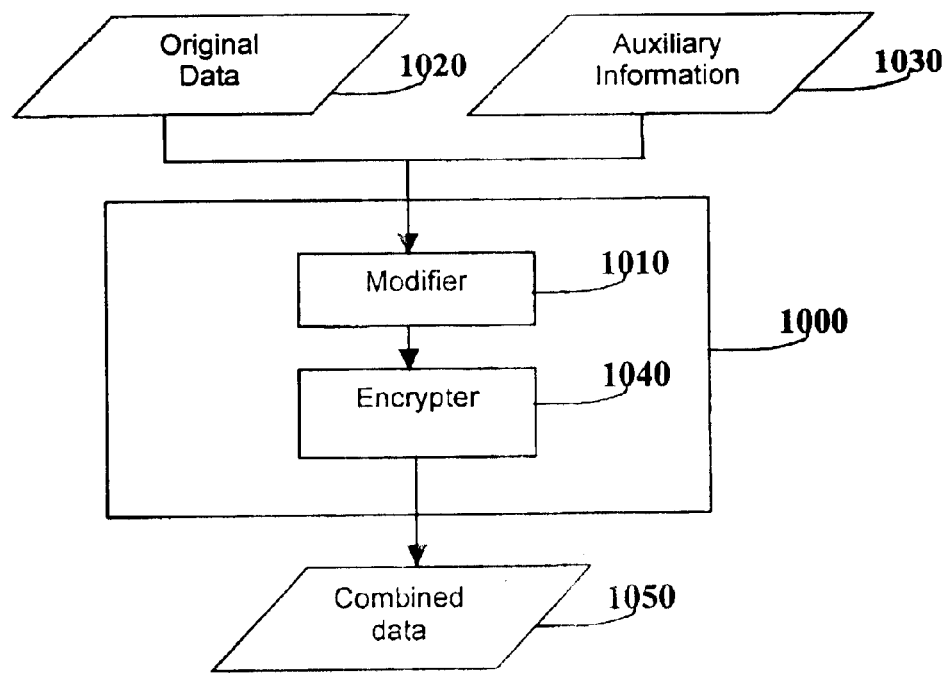
FIG. 10A shows an embodiment of the apparatus of FIG. 9 for dynamic locking.

FIG. 10A shows more detail of the apparatus for dynamic locking. Specifically, the logic processor 900 and memory 910 must work together to act as the modifier 1010 and encrypter 1040. Modifier 1010 performs the modification step of dynamic locking. Encrypter 1040 performs the encryption step of dynamic locking.

Figure 10B:
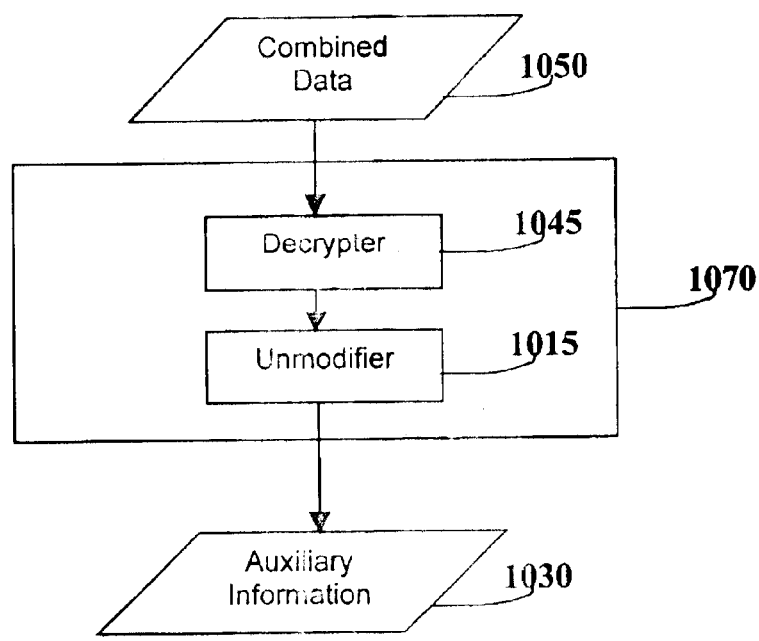
FIG. 10B is a block diagram showing an embodiment of the apparatus of FIG. 9 for dynamic unlocking.

FIG. 10B shows more detail of the apparatus for dynamic unlocking. Specifically, the logic processor 900 and memory 910 must work together to act as the decrypter 1045 and the unmodifier 1015. The decrypter 1045 performs the decryption step of dynamic unlocking. The unmodifier 1015 performs the unmodifying step of dynamic unlocking. The unmodifier 1015 and decrypter 1045 of dynamic unlocking may use the same or different circuitry as the modifier 1010 and encrypter 1040 of dynamic locking. However, when using the same circuitry, the dynamic locking and unlocking processes would use different control programs.

Conclusions, Ramifications and Scope

In summary, the main advantage of this invention is that it increases robustness of the embedded data.

The foregoing descriptions of the preferred embodiments of the invention have been presented to teach those skilled in the art how to best utilize the invention. Many modifications and variations are possible in light of the above teaching. For example, the method in which the auxiliary information is dynamically locked can easily be adapted and fall within the scope of this disclosure. In addition, applying the enabling concept to alternative data configurations is an obvious extension of the description above. To this end, the following claims define the scope and spirit of the invention.

What is claimed is:

1. A method of steganographically embedding auxiliary information in original data, said method comprising:
   receiving original data;
   receiving auxialary information, the auxiliary information being independent of the original data;
   changing the auxiliary information based on the original data, wherein said changing the auxiliary information based upon unchanged original data bits to be purposely skipped during said embedding; and
   steganographically embedding the changed auxiliary information in the original data.

2. A method of steganographically embedding auxiliary information in original data, said method comprising:
   receiving original data;
   receiving auxiliary information, the auxiliary information being independent of the original data;
   changing the auxiliary information based on the original data, wherein said changing the auxiliary information is based upon original data bits which are not used for embedding when a PN sequence designates the not used original data bits as non-embedding locations; and
   steganographically embedding the changed auxiliary information in the original data.

3. A method of enabling an action with embedded information, wherein the information comprises a correspondence to original data in which the information is embedded in, said method comprising:
   decoding the embedded information;
   verifying that the information corresponds to the original data; and enabling the action when both the information corresponds to the original data and the information permits the enabling.

4. The method of claim 3 wherein embedded information is steganographically embedded in the original data.

5. The method of claim 3 wherein the embedded information is embedded in at least one header associated with the original data.

6. The method of claim 3 wherein the original data comprises at least one of an image, audio and video.

7. A method of embedding auxiliary information in original data, said method comprising:

receiving original data, wherein the original data comprises a plurality of frames; receiving auxiliary information;

changing the auxiliary information based on the original data; and associating the changed auxiliary information with the original data, wherein a redundant instance of the changed auxiliary information is placed in each of a plurality of frame headers respectively associated with the plurality of frames.

8. The method of claim 7 wherein the auxiliary information is independent of the original data.

9. The method of claim 7 wherein the original data comprises at least video.

10. The method of claim 7 wherein the changed auxiliary data is placed in slots located in at least one header associated with one of the frames.

11. A method of embedding auxiliary information in original data, said method comprising:

receiving original data, wherein the original data comprises a plurality of frames;

receiving auxiliary information;

changing the auxiliary information based on the original data; and associating the changed auxiliary information with the original data, wherein a first portion of the changed auxiliary information is placed into at least a first frame header, and a second portion of the changed auxiliary information is place into at least a second and different frame header.

12. The method of claim 11 wherein the auxiliary information is independent of the original data.

13. The method of claim 11 wherein the original data comprises at least video.

14. The method of claim 11 wherein the changed auxiliary data is placed in slots located in at least one header associated with one of the frames.

* * * * *